(Model.)

S. T. FERGUSON.
Sulky Plow.

No. 243,236. Patented June 21, 1881.

WITNESSES:
W. W. Hollingsworth
Edw. W. Byrn.

INVENTOR:
Sam T. Ferguson
BY
ATTORNEYS.

UNITED STATES PATENT OFFICE.

SAM T. FERGUSON, OF MINNEAPOLIS, MINNESOTA.

SULKY-PLOW.

SPECIFICATION forming part of Letters Patent No. 243,236, dated June 21, 1881.

Application filed March 5, 1881. (Model.)

*To all whom it may concern:*

Be it known that I, SAM T. FERGUSON, of Minneapolis, in the county of Hennepin and State of Minnesota, have invented a new and Improved Sulky-Plow; and I do hereby declare that the following is a full, clear, and exact description of the same, reference being had to the accompanying drawings, forming part of this specification, in which—

Figure 1:
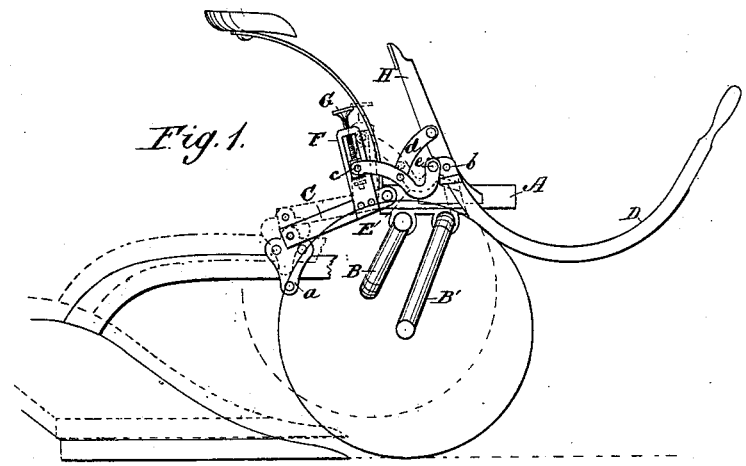
Figure 2:
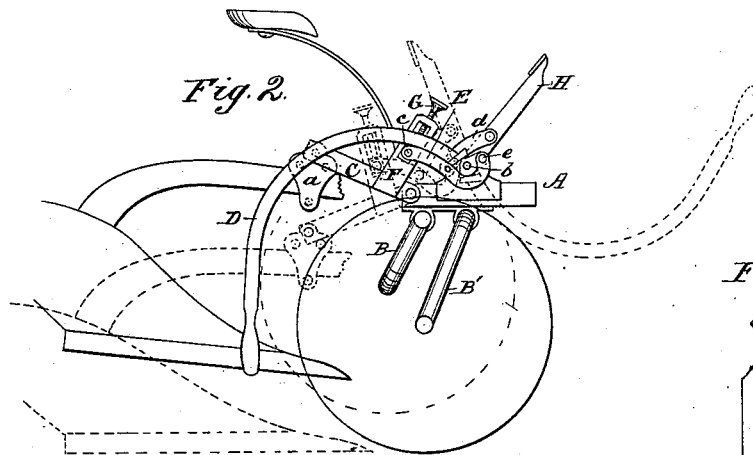
Figure 4:
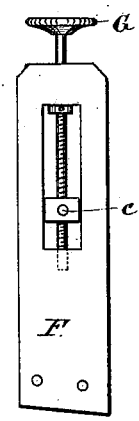
Figure 3:
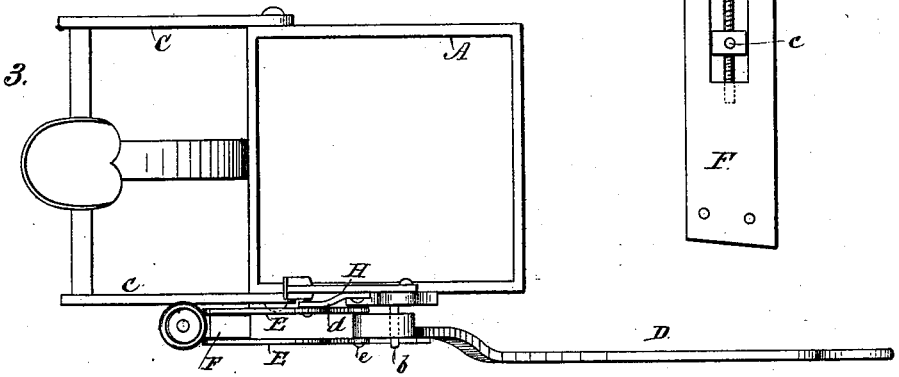

Figures 1 and 2 are side elevations from the same side of the implement, showing the adjusting devices in different positions. Fig. 3 is a plan view of the frame and levers. Fig. 4 is an enlarged detail of the devices for adjusting the plow vertically.

My invention relates to an improvement upon the sulky-plow for which Letters Patent were granted me February 5, 1878. In such patent the plow was swung from a bail which had an elbow-extension, which latter was connected by a link with the lower end of a hand-lever that was operated by the driver to raise or lower the plow.

My present invention consists in connecting the link to the bail by an elbow-extension which has a screw-connection with the said link, so that the point of connection between the link and this elbow-extension may be thrown closer to the center of oscillation of the bail, or farther from the same, so as to regulate the depth which the plow goes into the ground, the particular merit of this screw-connection being that it permits this adjustment to be made while the plow is in the ground and in operation without any movement of the lifting-lever.

The invention also consists in combining a supplemental foot-lever with the hand-lever which lifts the bail, which supplemental foot-lever has a link attached to the link which connects the hand-lever and bail-extension, so that when the hand-lever is drawn back to lift the plow out of the ground for transportation the foot-lever acts in unison by moving forward, so that the backward pull on the hand-lever and the forward push on the foot-lever permit the strength of the driver to be utilized to the greatest advantage.

In the drawings, A represents the body-frame of the sulky-plow, which is supported upon crank-axles B B', journaled in bearings beneath said frame, which crank-axles are of different lengths, as shown in my previous patent, and carry the two running wheels, as indicated by their circumferential lines.

C is the bail, which is jointed to the rear end of frame A, and is fastened to the plow-beam by a coupling, *a*.

D is the hand-lever, which is made with a rear curve, and is fulcrumed on a bolt, *b*, in an elevated support of frame A. The shorter end of this lever is jointed to the link E, which latter is jointed to an elbow-extension, F, of the bail. For adjustably connecting this link to the elbow-extension the latter is made slotted, and provided with a screw-nut, *c*, traveling in guides in said slot. To this screw-nut is jointed the rear end of link E, while a screw, G, swiveled in the elbow-extension F, passes through the nut and moves it up or down, according as the hand-wheel on said screw is turned. When the nut *c* is raised to its highest adjustment, as shown by the dotted lines in Fig. 1, the plow is elevated so as to run the shallowest, and when it is at the lower end of its slot the plow is gaged for its greatest depth. The merit of this construction, it will be seen, rests in the fact that this adjustment may be made while the plow is in the ground and in operation, without any movement of the hand-lever, and any degree of nicety of adjustment may be secured to suit the peculiar requirement of the soil.

H is the foot-lever, which is designed to supplement the hand-lever in raising the plow for transportation. This foot-lever is fulcrumed on the same center bolt, *b*, with the hand-lever, and is connected by a link, *d*, with the link E near its middle. Now, when the link E is to be pulled forward for raising the plow, the lever D is grasped with the hand and drawn back, and at the same time the foot is placed against the lever H and pressed forward, thus causing the hand and foot of the driver to act in unison or co-operate to raise the plow, and balancing the strain for the driver, so that he can use his strength to the greatest advantage.

In constructing the link E it is made of two bars and curved, as shown, so that when the hand-lever is thrown back to lift the plow the point *e* at which the link joins the lever is thrown above the fulcrum of the lever, as in Fig. 2, thus locking the plow up, while the inner side of the curved lever rests upon the top of the link, which acts as a stop. When the plow is down in the ground, as in dotted lines in Fig. 2 and full lines in Fig. 1, the point e is above the fulcrum of the hand-lever, and the plow is in that position locked down in the ground.

With respect to the feature of regulating the depth of the plowing, I would state that I am aware that the fulcrum of an elbow-lever has been made adjustable through a screw-connection, so as to raise or lower the plow, and I do not claim such screw-connection, broadly. With my construction the rigid arm F of the bail is made to contain the screw-connection, and the handle of the screw G is made to project up into range of reach from the driver's seat, so that this adjustment can be made while at work in the furrow without leaving the seat. As to the treadle H, also, I would state that I do not claim this, broadly, in connection with the hand-lever when arranged to move in opposite direction therefrom, as this has been done before. I do not know, however, that this foot-lever has ever been arranged to pull upon the link of the hand-lever by a separate link, d, above the fulcrum of the hand-lever, and I claim this as my invention.

Having thus described my invention, what I claim as new is—

1. The combination, with the plow, the bail C, having upwardly-extended and slotted arm F, and the link of the hand-lever, of a screw-stem, G, projecting upwardly through the said arm into range of reach from the driver's seat, and a nut connected to the link and surrounding said screw, substantially as shown and described.

2. The combination, with the link E and the hand-lever D, of the foot-lever H and a separate link, d, connecting the foot-lever to the link of the hand-lever, and extending above the fulcrum of the hand-lever, as shown and described.

SAM T. FERGUSON.

Witnesses:
EDWD. W. BYRN,
CHAS. A. PETTIT.